Sept. 6, 1932.    R. D. STOCKSTILL    1,875,673
WELL CONTROL AND SAFETY VALVE MECHANISM
Filed Oct. 28, 1929    3 Sheets-Sheet 1

Inventor
Ralph D. Stockstill
By Fred D. Hayn
Attorney

Sept. 6, 1932.  R. D. STOCKSTILL  1,875,673
WELL CONTROL AND SAFETY VALVE MECHANISM
Filed Oct. 28, 1929  3 Sheets-Sheet 2
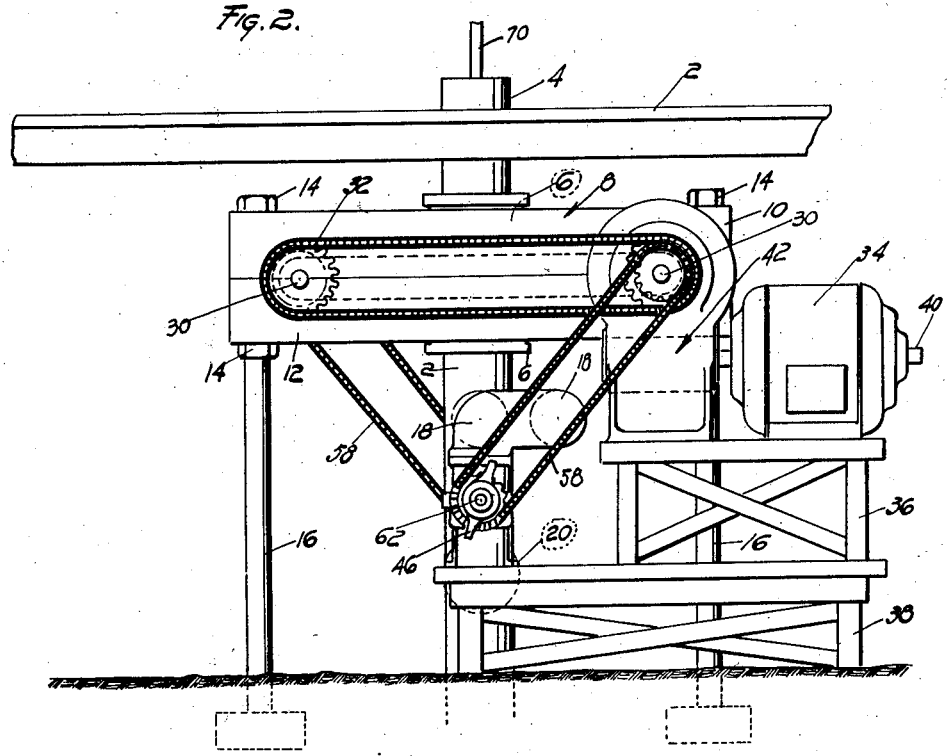
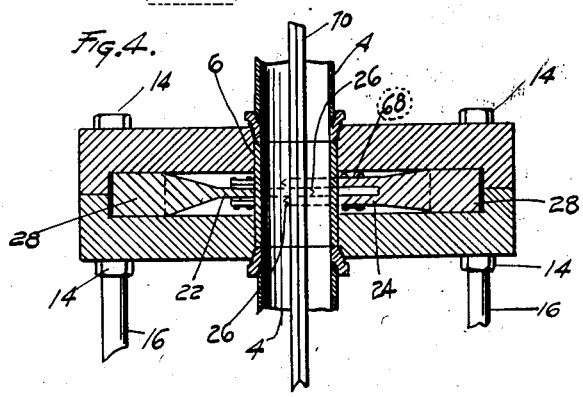
Inventor
Ralph D. Stockstill
By Fred H. Hayn
Attorney Sept. 6, 1932.   R. D. STOCKSTILL   1,875,673
WELL CONTROL AND SAFETY VALVE MECHANISM
Filed Oct. 28, 1929   3 Sheets-Sheet 3
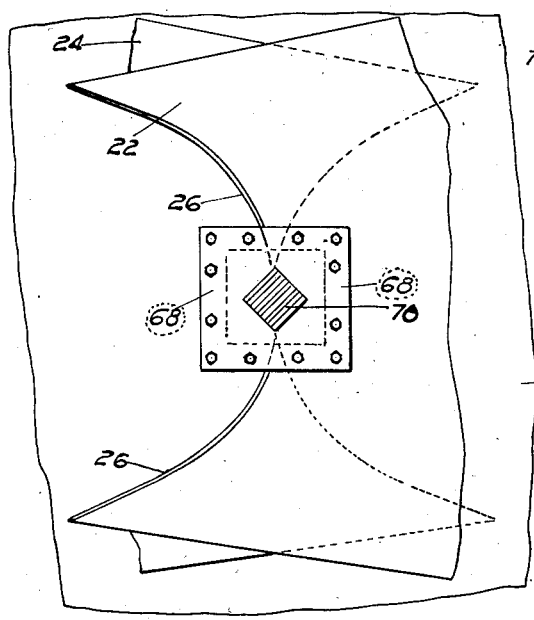
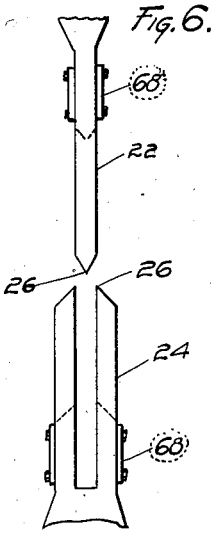
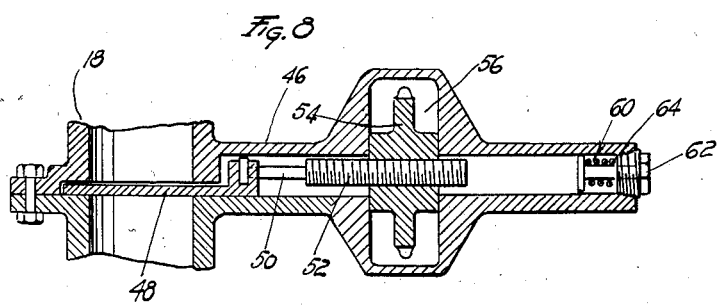
Inventor
Ralph D. Stockstill
By
Attorney Patented Sept. 6, 1932

1,875,673

UNITED STATES PATENT OFFICE

RALPH D. STOCKSTILL, OF SIMONS, CALIFORNIA

WELL CONTROL AND SAFETY VALVE MECHANISM

Application filed October 28, 1929. Serial No. 402,960.

My invention relates to means for cutting or shearing off and closing the ends of tubing, and more particularly to that employed in oil well practice, where it is desirable to extinguish, or control oil well fires or gushers, so that the fluid in the well may be diverted to remote points so that a fire may be extinguished or a gusher controlled.

It accordingly is an object of my invention to provide a novel form of apparatus in which a tubing is provided with a section of relatively softer material, said section being preferably embraced by cutting or shearing means, which may be in the form of a pair of male and female cutting elements, which elements are adapted by any preferred means to be given a translatory movement with respect to the tubing so said tubing may be sheared off and closed, means being also provided whereby said tubing may be sealed after it has been closed.

Another object of my invention is to provide the tubing with a fluid diverting means, preferably in the shape of one or more valve controlled by-passes, it being possible, if desired, to actuate the by-pass valves simultaneously with the cutter blades.

It is also within the province of my invention to automatically control the apparatus by predetermined pressure or temperature conditions of the fluid in the tubing of the well.

The above, and further objects and advantages of my invention, as will hereinafter more fully appear, I attain by the apparatus preferably constructed in accordance with the specification, and illustrated on the drawings, forming a part of my application.

Figure 1:
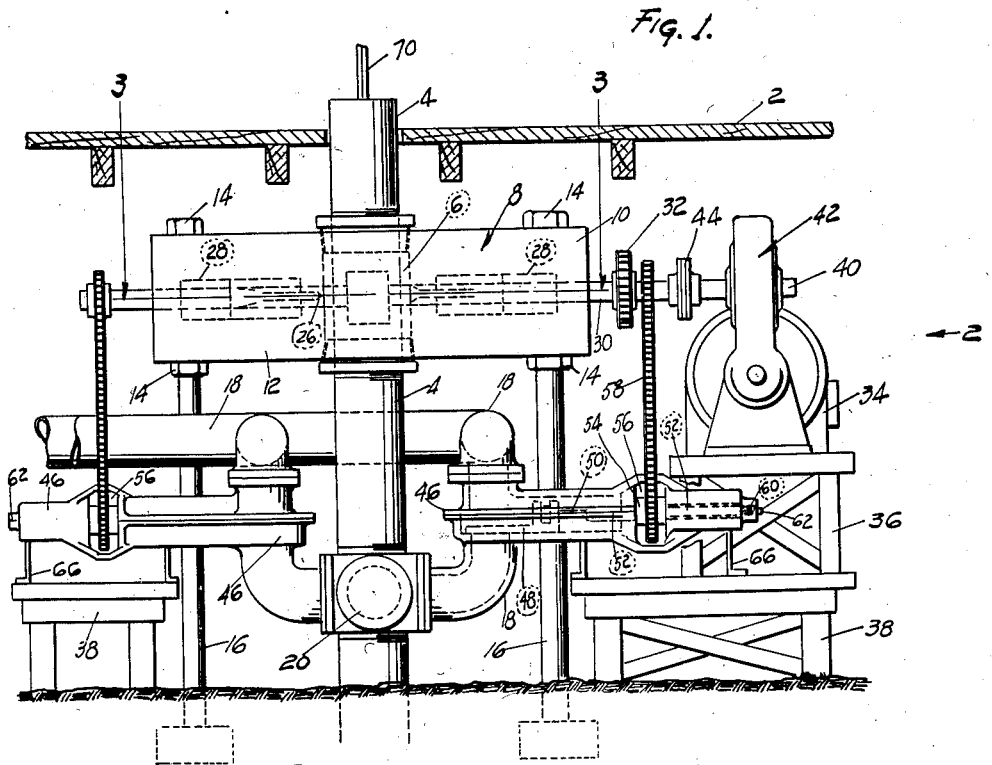
Figure 3:
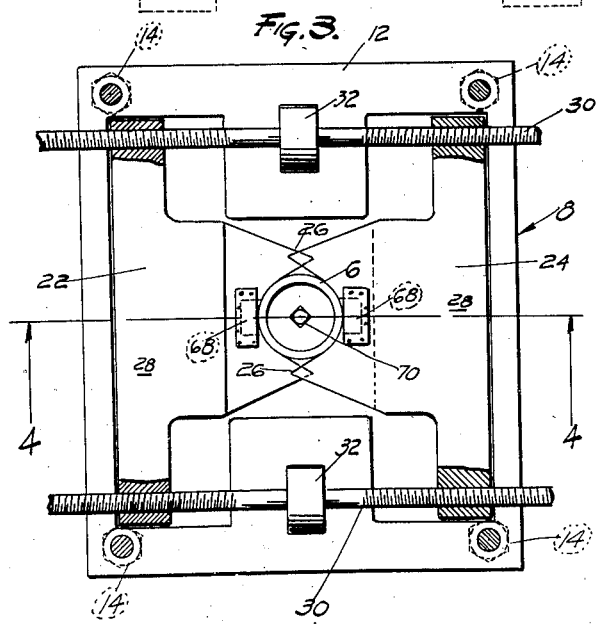
Figure 5:
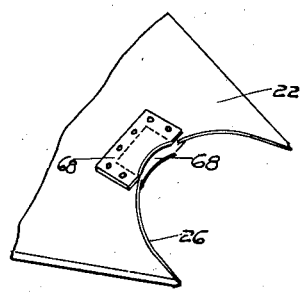

Reference is had to the accompanying drawings, in which similar reference charters denote similar parts. In the drawings, Fig. 1 is a part sectional and part elevational view of the apparatus, Fig. 2 is a view similar to Fig. 1, but looking from the right of said figure, Fig. 3 is a sectional view, taken on the line 3—3, Fig. 1, looking in the direction of the arrows, Fig. 4 is a similar view taken on the line 4—4, also looking in the direction of the arrows, Fig. 5 is a fragmentary perspective view of one of the cutter blades or elements, Fig. 6 is an enlarged detail fragmentary end elevational view of the male and female cutter blades, shown separated from the apparatus, Fig. 7 is an enlarged fragmentary detail plan view of the cutter elements in the position assumed when the tubing has been cut, closed and sealed, and Fig. 8 is an enlarged fragmentary sectional detail view through one of the by-pass valves and operating means therefor.

Describing my invention more in detail, in its broader aspects, said invention comprises a novel means for closing and sealing the ends of a tubing, preferably having a section of relatively softer material, which section is adapted to be cut or sheared off by cutting elements, which cutting elements are adapted to penetrate and close said section, a sealing means being also provided to seal said tubing after it has been cut and closed.

The tubing associated with the well may also be provided with one or more by-passes, controlled by suitable valves, which valves, if desired, may be simultaneously actuated with the cutter blades or elements, as for example, by an electric or other motor, the means for transmitting the movement of said motor to said blades and valves being any that in practice may be suggested.

More specifically, my invention comprises an apparatus adapted to be positioned in the well rig 2, and associated with the tubing 4 of said well, said tubing being provided with a section 6 of relatively softer material of any preferred kind, it being immaterial how said section in practice is associated with said tubing, so long as it is of softer material so it may be readily cut.

As seen more particularly in Figs. 1 and 2, a framework or mounting 8 surrounds the tubing 4, which framework has an upper member 10 and a lower member 12, which members may be secured together by any suitable means, as the nut and bolt construction 14, said framework, if desired, being mounted upon standards or supports 16, sunk in the ground, as shown in Figs. 1 and 2, if so desired.

The tubing 4, as seen in Figs. 1 and 2, may also be provided with one or more by-pass pipes 18, connected in any preferred way to said tubing, such as the union 20, to provide a diverting means for the fluid in the tubing 4, which by-pass pipes are controlled and function for a purpose presently to be described.

Positioned within the framework 8, and mounted for translatory movement therein, are the cutter blades or elements 22 and 24, the former, as seen more particularly in Fig. 6, comprises a male member, and the latter a female member, said blades having their cutting edges 26 of any preferred configuration, and preferably embracing the softer section 6 (see Fig. 3). Said blades, of course, may take any form or shape in practice preferred, and the means for actuating the same may be widely varied.

As seen more particularly in Fig. 3, each blade may have a thickened or bar portion 28 of sufficient rigidity to receive the worm or screw constructions 30, which pass through said bar portions, and also, if desired, through supports or guides 32, associated in any preferred way with the framework 8, to support and steady the movement of the blades.

It will, of course, be understood, that any other preferred way of actuating the blades 22 and 24 may be used, and that disclosed is suggestive merely.

The worm or screw shafts 30 may be simultaneously or individually actuated by any suitable mechanism, such as the chain and ratchet means 32, said shafts or worms, when operated simultaneously, rotating in opposite directions.

To operate the shafts 30, any suitable means may be employed, either at a distance or by a mechanism situated close to the tubing 4. In the present instance, I have shown a motor 34, which may be positioned upon a suitable mounting or platform 36, which in turn may be mounted on another such mounting or platform 38, it being, however, within the province of my invention to mount said motor in any way in practice preferred. The purpose of the second platform will be presently explained.

The shaft 40 of the motor 34 may have a conventional worm and gear structure 42 to transmit the power from said motor to the shafts 30, a conventional coupling means 44, if desired, coupling the same to the shaft of the worm gear structure. This particular structure, of course, is immaterial, and any other means for transmitting the power from the motor 34 to the shafts 30 may be substituted therefor, and still remain within the province of my invention.

To relieve the pressure of the fluid on the cutter blades 22 and 24, and to divert the fluid so it may be controlled, I provide the by-pass means 18, as hereinafter stated, which means may in practice be varied. Each pipe 18 has associated therewith a housing 46 of suitable form, and each of said housings is provided with a valve 48, which may be of any preferred type, but in the present instance shown as a slide valve operating within the casing 46, to open and close the pipe 18. See Fig. 8, more particularly.

The valve stem 50, suitably connected to the valve 48, has a worm 52, operating in a sprocket wheel 54, within an opening 56 in the housing 46, which sprocket wheel is operated by a chain 58, which chain is also mounted upon a complementary sprocket wheel on one of the shafts 30. See Figs. 1, 2 and 8. To prevent the valve 48 from sticking, a conventional or other buffer means 60, closed by the screw plug 62, may be provided, the spring 64 of which serves to start the stem 50, after it has been compressed. It will also be understood that this structure may be changed as in practice desired or found necessary.

If desired, a suitable support 66 may be provided for supporting the outer ends of the casing 46, which supports may rest in the tables or mountings 38, which are provided for this purpose. Any other means of support, however, may be used.

To seal the tubing after it has been cut, the upper and lower portions of each blade may be provided with a suitable rubber cushion 68, or other preferred sealing material, associated with said plates in any manner in practice preferred, the purpose of said rubber or other material being to seal any opening when the blades come together about the "kelly" or rod 70 extending through the tubing 4, which, if the well is on fire, causes the sealing material to be melted and hence forms an effective seal at that point.

In operation, should the fluid in the well take fire, or it is desired to control a gusher, the parts being in the position shown in Fig. 1, the motor 34 is either automatically or manually set in operation. This causes the shafts 30 to rotate, and the cutters are moved toward each other. At the same time the chains 58 through sprocket wheels 54, cause the worms 52 to turn, thus opening the valves 48 as said blades come together, which blades cut through the softer section 6, overlapping as shown in Fig. 7, effectively closing about the kelly 70, the rubber or sealing material 68 melting and effectively sealing any holes about said kelly, the fluid flowing through the by-pass pipes 18, where it may be controlled at a remote point. In closing the valves 48, the springs 64 being compressed, upon reversal of the motor 34, said valves are prevented from sticking, and the blades are again opened, after which a new section 6 may be inserted.

While I have thus described my invention with great particularity, it will be clear that the same may be modified throughout a wide range. I accordingly do not propose to be limited to the exact details of construction shown and described, but reserve the right in practice to make any and all modifications thereof that fall within the scope of the appended claims.

I claim as my invention:

1. In an oil well fire and gusher extinguisher, in combination, a sectional tubing, a coupling connecting two of the sections of said tubing, said coupling being of softer material than said tubing, by-pass means connected to said tubing below said coupling, means for controlling said by-pass means, and combined cutter and closure means associated with said coupling for cutting the latter, whereby said tubing may be closed at said coupling.

2. In an apparatus of the class described, a tubing, a pair of male and female cutters having their cutting edges embracing said tubing, sealing means on each of said cutters juxtaposed to said cutting edges, means for operating said cutters so they will cut through and close said tubing, and means for simultaneously diverting the fluid in said tubing as said tubing is cut and closed.

3. In an apparatus of the class described, a tubing, means for shearing off and closing said tubing, at least one valve controlled by-pass for diverting the fluid in said tubing, and a motor for simultaneously operating said shearing and diverting means.

4. In an apparatus of the class described, a tubing, combined means for shearing off and closing said tubing, fluid diverting means associated with said tubing, a motor for simultaneously actuating said shearing and said diverting means, and means associated with said combined means for automatically sealing the same.

5. In an apparatus of the class described, a tubing having a section of relatively softer material, a pair of cutters having their cutting edges embracing said section, means associated with said cutters whereby they may be given a translatory movement to cut and close said section, means for diverting the fluid in said tubing below said section, means for operating said cutters, and means for operating said fluid diverting means.

6. In a well capping apparatus for extinguishing burning oil wells, a casing through which the tubing of the well is adapted to extend, overlapping cutters for cutting said tubing and capping the same, means for simultaneously actuating said cutters, and means, rendered effective by the heat of the burning well for sealing said tubing when capped.

7. In a well controlling means, including a tubing having a section of relatively softer material than the other parts of said tubing, the combination of a male cutter and a female cutter, means for moving said cutters so they will cut and close said tubing at said section, and means associated with said last mentioned means for insuring an even movement thereof.

8. In a well controlling mechanism, including a tubing having a section of relatively softer material than the other parts of said tubing, the combination of a female cutter having arcuate cutting edges, a male cutter also having an arcuate cutting edge, and means associated with both of said cutters whereby said cutters may be simultaneously moved to cut said tubing through said section and close said section.

In testimony whereof I have signed my name to this specification.

RALPH D. STOCKSTILL.